US009159059B2

(12) United States Patent
Daddabbo et al.

(10) Patent No.: US 9,159,059 B2
(45) Date of Patent: Oct. 13, 2015

(54) METHOD OF OPERATING A TERMINAL

(75) Inventors: Nicholas Francis Daddabbo, Auburn, NY (US); William H. Havens, Syracuse, NY (US); Timothy Robert Fitch, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1556 days.

(21) Appl. No.: 11/367,110

(22) Filed: Mar. 3, 2006

(65) Prior Publication Data
US 2007/0205272 A1    Sep. 6, 2007

(51) Int. Cl.
G06Q 30/00    (2012.01)
G06Q 20/18    (2012.01)

(52) U.S. Cl.
CPC ..................... G06Q 20/18 (2013.01)

(58) Field of Classification Search
USPC ................. 235/375, 380, 384, 385
See application file for complete search history.

(56) References Cited

U.S. PATENT DOCUMENTS

| | | | | |
|---|---|---|---|---|
| 6,196,460 | B1 * | 3/2001 | Shin | 235/380 |
| 6,742,887 | B2 * | 6/2004 | Ando | 347/109 |
| 7,617,129 | B2 * | 11/2009 | Momose | 705/26 |
| 2002/0003892 | A1 * | 1/2002 | Iwanaga | 382/124 |
| 2002/0005430 | A1 * | 1/2002 | Pentel | 235/375 |
| 2002/0060243 | A1 * | 5/2002 | Janiak et al. | 235/382 |
| 2002/0066042 | A1 * | 5/2002 | Matsumoto et al. | 713/202 |
| 2002/0180585 | A1 * | 12/2002 | Kim et al. | 340/5.53 |
| 2003/0061271 | A1 * | 3/2003 | Pittarelli | 709/203 |
| 2003/0085808 | A1 * | 5/2003 | Goldberg | 340/531 |
| 2004/0078335 | A1 * | 4/2004 | Calvesio et al. | 705/50 |
| 2004/0172484 | A1 * | 9/2004 | Hafsteinsson et al. | 709/246 |
| 2004/0210759 | A1 * | 10/2004 | Fitch et al. | 713/186 |
| 2005/0009564 | A1 * | 1/2005 | Hayaashi et al. | 455/558 |
| 2005/0261978 | A1 * | 11/2005 | Hung | 705/26 |
| 2006/0000903 | A1 * | 1/2006 | Barry et al. | 235/385 |
| 2006/0074803 | A1 * | 4/2006 | Crowell et al. | 705/40 |
| 2006/0261149 | A1 * | 11/2006 | Raghavendra Tulluri | 235/379 |
| 2006/0265361 | A1 * | 11/2006 | Chu | 707/3 |

* cited by examiner

Primary Examiner — Daniel Hess
(74) Attorney, Agent, or Firm — Additon, Higgins & Pendleton, P.A.

(57) ABSTRACT

A method of operating a terminal at an airport beyond security screening, the terminal having a housing, a display, a reader configured to read data from an information bearing medium comprising the steps of: reading a personal identification; performing at least one of the following functions: gate check-in; employee access terminal to a jetway; changing seats; ordering meals; accessing frequent flier programs; processing boarding passes; reading passports and displaying flight information. A method of operating a terminal at a restaurant, the terminal being hand held and having a housing, a display, a reader configured to read data from an information bearing medium comprising the steps of: reading personal identification; performing at least one of the following functions: ordering meals; bill payment; displaying menu items; viewing meal order status; and verbal communications.

7 Claims, 5 Drawing Sheets

METHOD OF OPERATING A TERMINAL

FIELD OF THE INVENTION

This invention relates to terminals, and generally to terminals for completing transactions.

BACKGROUND OF THE INVENTION

Terminals are in use today at locations where a person makes a transaction in an establishment. Most of the terminals have data reading capability for acquiring customer held data which is applied to a microprocessor to identify the customer and process the necessary data to complete a transaction. Sometimes as part of the transaction, the customer is asked to sign his or her name upon a signature capture pad and the signature is electronically recorded as part of the transaction. Other times the card user is asked to input data through some type of real or virtual keypad.

Currently available terminals have been observed to exhibit numerous limitations. Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

Terminals according to the invention may be adapted for reading card or other personal information, for secure receipt of personal identification (PIN) information, for signature capture, and numerous other functions. Exemplary cards which may be processed by a terminal include a credit card, a debit card, customer loyalty card, an electronic benefits card, a company-sponsored benefits card, an identification card, an airline or other ticket, etc.

A detailed description of terminals and their operation is disclosed in commonly owned published United States Patent Application Publication No. 20030132292, which is hereby incorporated herein in it's entirety. Examples of terminals are Catalog Nos. TT8870 and 9500 available from Hand Held Products, Inc.

Figure 1:
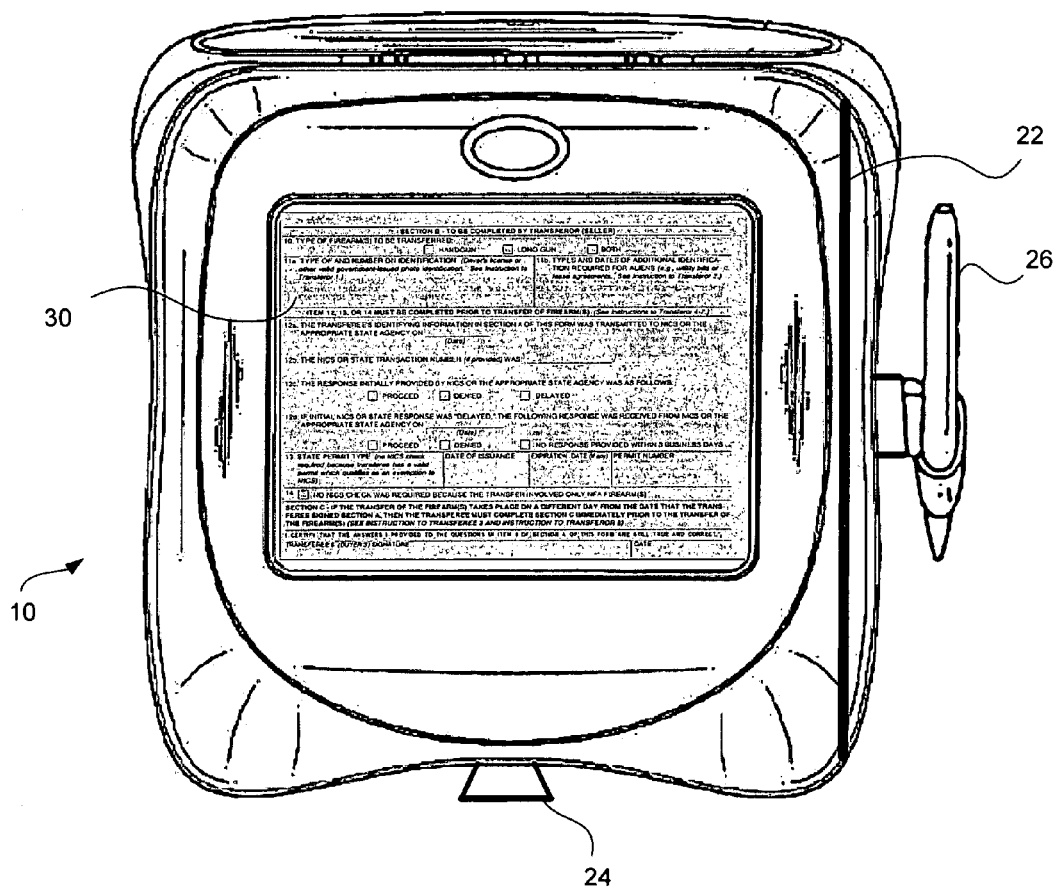
FIG. 1 is a top view of a terminal in accordance with the present invention.

FIG. 1 illustrates a terminal 10 which includes a housing having a top, a bottom, a front, and sides. Integrated in the top of terminal 10 is a touch screen 30 comprising a display and a touch sensitive overlay disposed over the display. Disposed in the housing may be one or more data readers for obtaining information from an information bearing medium, such as a card having a magnetic strip (mag strip) or symbol indicia (such as one or two dimensional symbologies), an RFID instrument, biometric information such as a fingerprint, etc. An exemplary data reader which may be disposed in terminal 10 is a mag strip reader 22 or an optical reader unit 24 or imaging assembly, such as a model IT 4000 or IT 4200 optical reader module with decode out circuit of the type available from Hand Held Products, Inc., as are substantially described in United States Patent Application Publication No. 20030029917 entitled "Optical Reader Imaging Module" incorporated herein by reference and U.S. Pat. No. 6,832,725 entitled "Optical Reader Comprising Multiple Color Illumination" also incorporated herein by reference.

A stylus 26 may be included which is disposed in a specially configured holder apparatus adapted for attachment either on the housing or elsewhere. Terminal 10 further includes I/O connection ports (not shown) for allowing communication with other computers or other host computer systems, e.g., server system, or hub computer systems as will be described later herein. The terminal may be configured for either wired or wireless communication.

Figure 2:
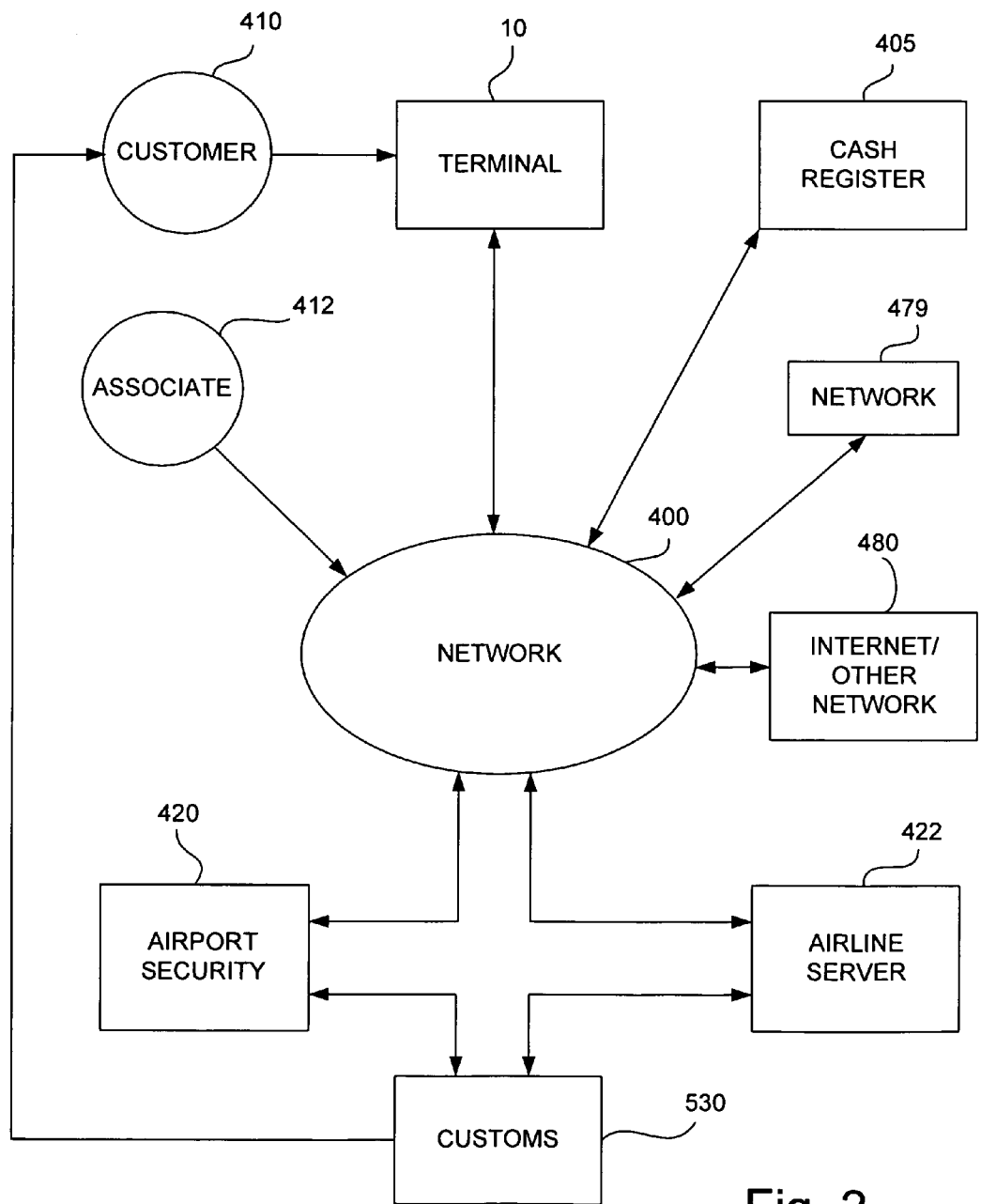
FIG. 2 is a block diagram of a network for utilizing a terminal in accordance with the present invention.

It is to be noted that an aspect of the present terminal is that it is portable due to it's compact size. This aspect is particularly useful in conjunction with wireless functionality. Some further aspects of possible transactions involving terminal 10 can be understood with reference to the following examples. Transaction terminals may be implemented with internal batteries making them independent of any wired connectivity.
Airport Applications FIG. 2 illustrates an environment in which a terminal 10 may operate in accordance with the invention. The terminal may be disposed as a kiosk in a location where customers do business. When a customer interfaces with the kiosk or makes a transaction, terminal 10 may communicate transaction information to a network 400. Networks take on a variety of forms including a dial-up or cable modem interfaces, satellite connectivity, USB interfaces, ethernet interfaces including wireless and non-wireless which enable communication between devices. For instance, the transaction terminal may communicate with one system 405 which may be one of several that is in communication with a local area network (LAN) which may be in communication with a larger network 479, 480.

The network can also be considered to include various computer systems operated by parties other than a retailer or for example, a network can include a distribution network operated by distribution service providers who receive transactional data from a locality and evaluate the availability of several debit or credit card networks and route the data to one selected debit or credit card networks or based on an established criteria. Some transactions are processed without being routed through distribution networks.

The network may include at least one computer system hub which is under the control located off-site with respect to terminal and other on-site devices such as registers or other terminals and servers. The hub may be in communication with, and may be adapted to monitor and control financial data transaction emanating from a plurality of on-site servers controlled by a system that operates several systems at different locations. Further, there may be more than a layer of hubs.

An establishment may operate a local hub which receives transactional data from each of several on-site servers located at several entities located in a given geographic area. Several of these local hubs, in turn, may transmit transactional data to a regional hub. Several regional hubs may transmit transactional data to a centralized national hub. Several national hubs, in theory, can transmit transaction data to a single world-wide hub operated by a business having locations worldwide. It is seen that hubs and the layering of hubs provide a means for businesses to monitor transactions conducted throughout several locations. Hubs are often owned and operated by a business who owns or operates a location in which the terminal is located. However, the hub may also be owned by a third party service provider, and the business may subscribe to a processing service provided by the third party.

The network may be in communication with another computer network, which may be the internet (World Wide Web) 480. Connecting networks facilitates ready access to information from a wide variety of computer databases, which information is pertinent to financial transactions. For example, a network in accordance with the present invention may access such information as drivers license identification information, customer credit rating information, customer criminal record information, sales history information, customer demographic data, and other customer information.

Terminal 10 may be disposed in a on-site kiosk, or customer service desk. A kiosk is a term used herein to describe terminals that perform certain customer interactive functions.

Exemplary to FIG. 2, the terminal 10 may be utilized as a kiosk at an airport as a customer service terminal in various locations. For instance, the kiosk may be located in an area which is beyond airport security checkpoints or screening, such as at a gate terminal or jetway. In operation, a customer presents one or more information bearing medium, which may be in the form of an identification instrument such as a credit card, boarding pass, flight ticket, employee badge, etc., or government identification instruments such as a driver's license, passport, military card, etc. for the terminal to read through one or more of it's data readers. Identification may include reading only one form of identification or it may include multiple steps, such as readable identification plus input of a personnel identification number (PIN), or readable identification and then reading a flight ticket. Once the customer has been identified, the terminal provides one or more operative options for the customer to engage in through a graphic use interface (GUI) provided on the terminal display. Operative options may include such exemplary things as, baggage check, gate check-in, upgrading seats, changing seats, ordering meals, signing up for frequent flier programs. The terminal may also be used to process boarding passes at the airport jetway. The terminal may also be used to pre-order meals for the upcoming flights, leveraging it's payment capability. The terminal may also read smart card based passports (not shown). The terminal may be used for an employee access terminal at an airport jetway. The terminal would be linked to a back end database(s) 420, 422, 430, 480 in order to facilitate such information exchange. The unit may communicate wired or wireless. The terminal may also be linked to peripherals like a printer, biometric reader, or other device. Through the display, a customer might be able to view flight information, such as delays, cancellations, gate changes, arrival times, departure times, etc. The terminal may be linked to another terminal or computer 412 so that an airline associate may provide remote help or service, or it may have a microphone or speaker for communication purposes.

Firearm Eligibility Verification

Figure 3:
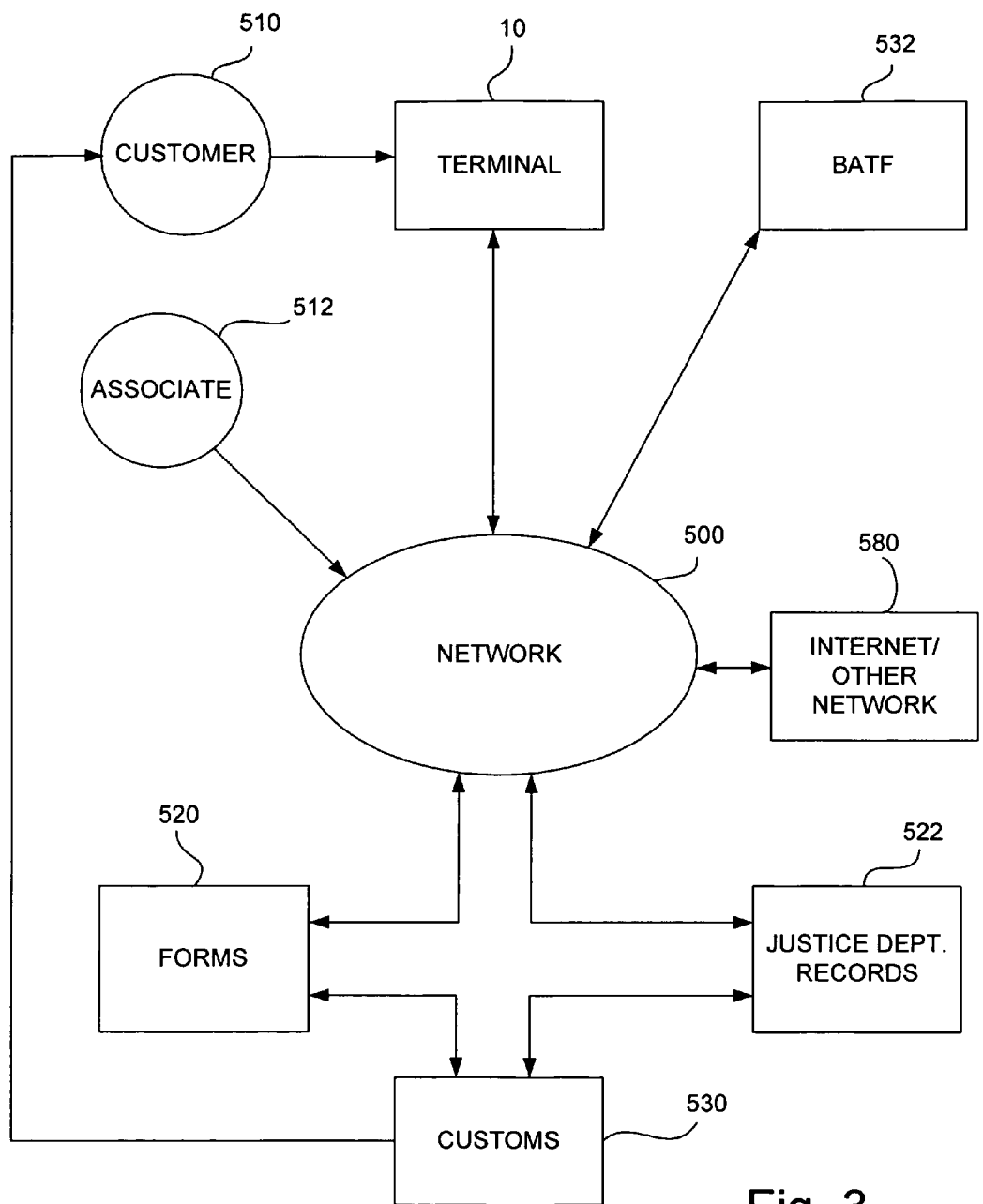
FIG. 3 is a block diagram of a network for utilizing a terminal in accordance with the present invention.

Referring to FIG. 3, the terminal 10 may be utilized as a kiosk to verify eligibility for purchase of firearms to meet the requirements of Public Law 105-277, Omnibus Consolidated, and Emergency Appropriations Act, 1999. The required BATF Form 4473 or other statutorily required forms 520 may be displayed, completed and filed electronically on the terminal. The questions may be answered by the customer through the touch screen on the terminal. The signature may be attached to the form electronically and the identification may be captured through bar code, mag stripe or picture. A high speed communication may be used to compare entered data against government databases such as customs, the justice department, the BATF, police departments, etc. 522, 530, 532, 580 to thwart illegal purchases of firearms. The storage capability onto a back end data base may also provide capability for recall if needed. The terminal may be linked to another terminal or computer 512 so that an associate may provide remote help or service.

Restaurant Payment Terminal

Restaurant transactions typically have to be handled twice: once when the credit worthiness of a credit card is checked before printing the copy to be signed and a second time after the tip has been added when the transaction is actually entered in order to facilitate the restaurant business if the transaction could be automatically completed.

Figure 4:
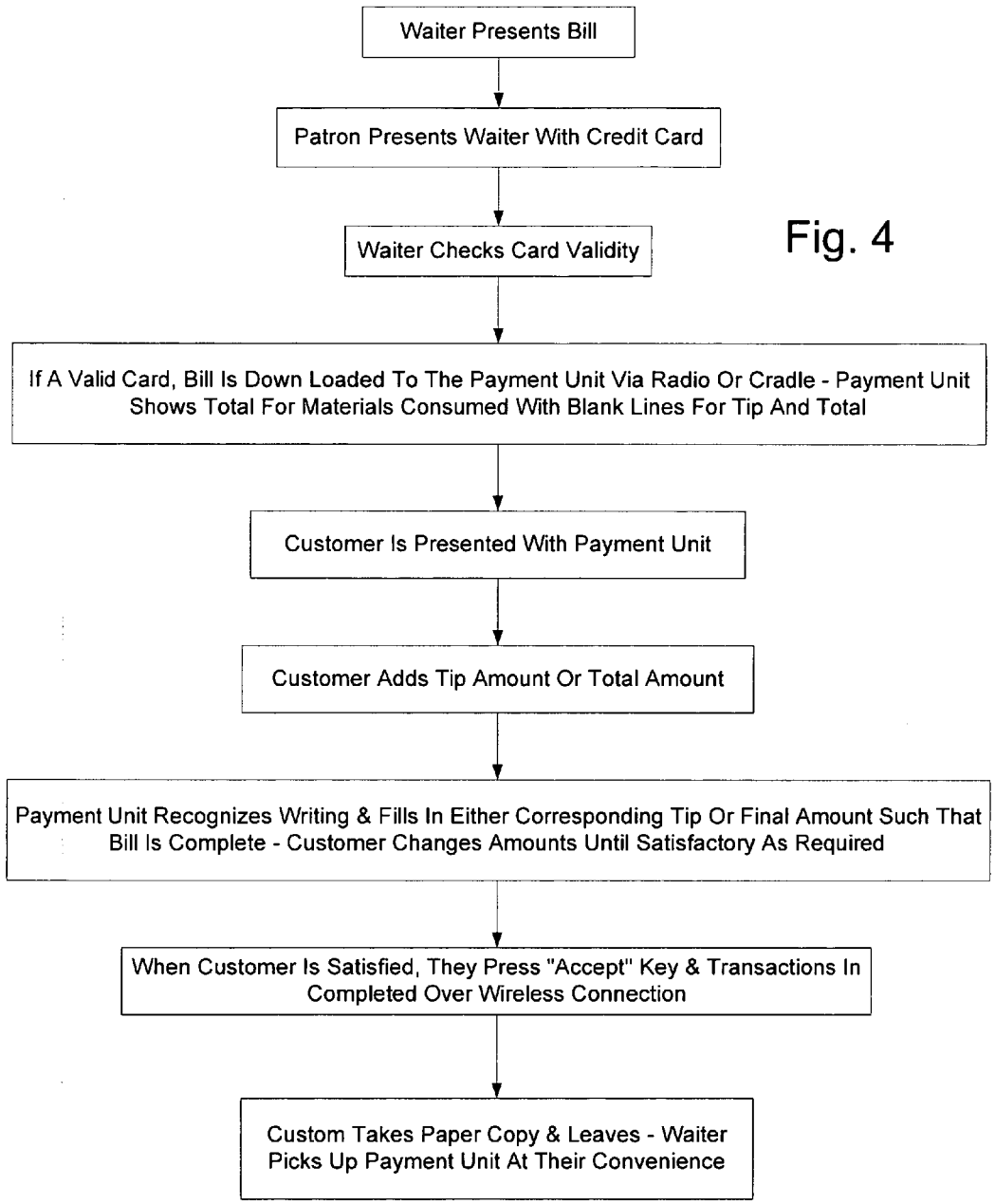
FIG. 4 is flowchart for operating a terminal in accordance with the present invention.

The terminal may be a small, light, battery powered portable unit with a touch sensitive display and wireless connection to the restaurant register that addresses the credit card billing system. At sometime during the visit, the patron would be presented with the unit to complete a transaction. An exemplary event series is illustrated in FIG. 4.

The waiter presents bill.

The customer presents the waiter with credit card.

The waiter checks card validity.

If a valid card, bill is down loaded to the payment unit via radio or cradle, the payment unit shows the total for materials consumed with blank lines for tip and total.

The customer is presented with payment unit & paper copy with blanks for tip & total.

The customer adds tip amount or total amount with attached stylus, numeric keypad on face of unit, or display of numeric keypad on display.

The payment unit recognizes writing and fills in either corresponding tip or final amount such that bill is complete.

The customer changes amounts until satisfactory as required.

When the customer is satisfied, he presses "accept" key and the transaction is completed over the wireless connection.

The customer takes paper copy of the bill and leaves.

The waiter picks up payment unit at their convenience after the transaction is finished.

Additional events, deletion of steps, and variations to this event series may be made. For example, alternatively, the terminal could have a data reader, and the patron could validate his own credit/debit card in a manner similar to a self checkout terminal. Alternately the unit may be equipped with a printer, the bill can be printed at the table. In this manner, the entire transaction could be completed at the meal table.

If the terminal is placed at the dining table, the order could be updated or the meal progress checked by the wireless connection as the meal progresses. The unit could also display daily specials for the customer and show order details.

Figure 5:
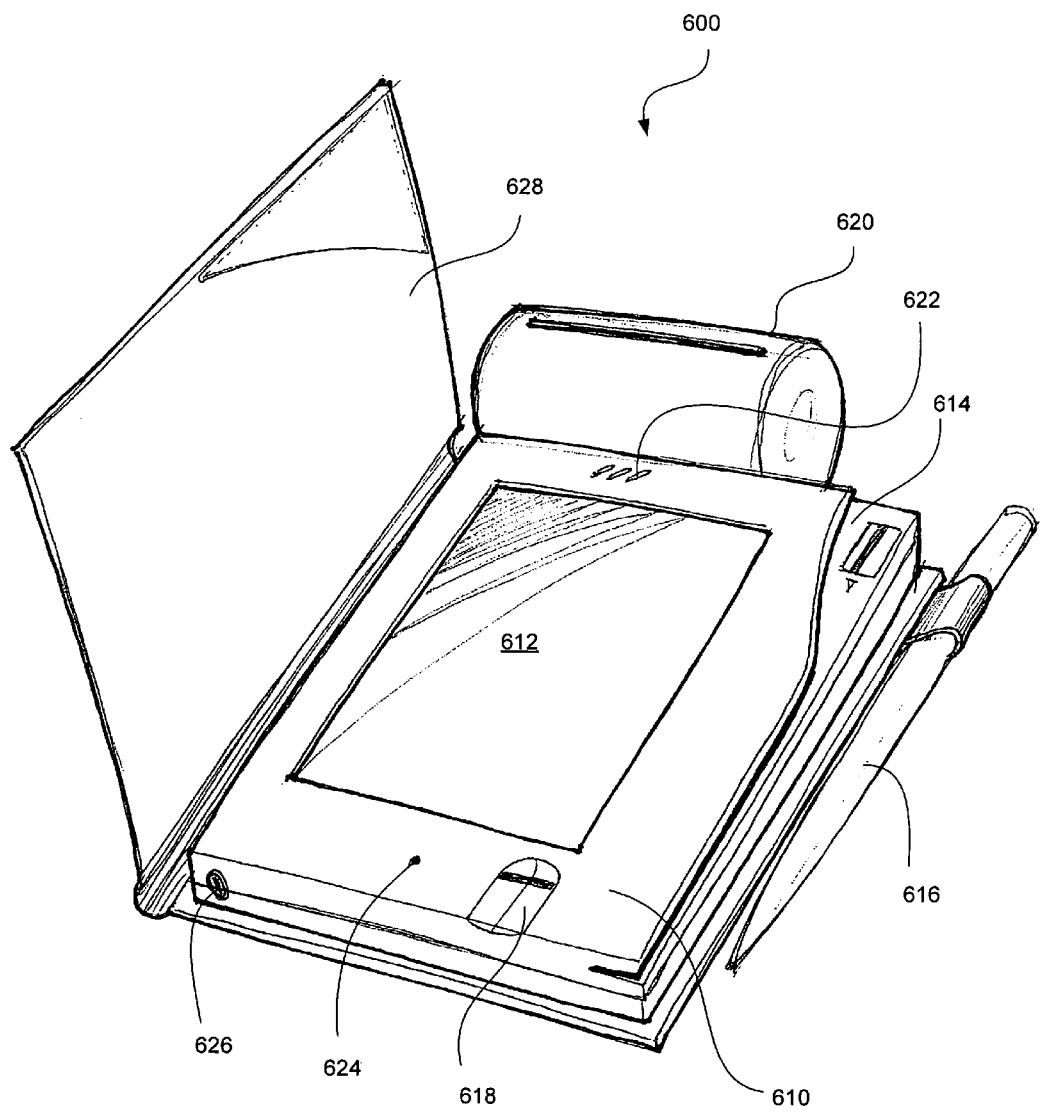
FIG. 5 is a perspective view of a terminal in accordance with the present invention.

A keypad or virtual keypad might be provided for order entry. The terminal might be placed in a presentable, book like holder to mimic existing bill holders. An exemplary terminal 600, illustrated in FIG. 5, includes a body 610, a touch screen 612, a card reader 614, a stylus 616, a biometric reader 618 (for store personnel or customer), a printer 620, a speaker 622, a microphone 624, and a jack for a headset or Bluetooth headset 626. A folio 628 may be provided for protecting the unit. The folio may have a flap for holding bills or cards, etc. The speaker and/or the microphone may be utilized to communicate with establishment associates for such things as changing orders, requesting assistance, etc.

The kiosk may also be used as a self pay or self checkout terminal located in an establishment so that customers may, for instance, pay their bill without interaction with a store employee. The terminal could also be used as a gate access or exit control. The terminal could be set up so that it would sound an alarm when it left a certain area, either by sensing loss of radio contact with the base station or sensing a special RFID tag placed near the exits.

Age Verification Terminal

The terminal may be utilized as a kiosk for age verification. The terminal may read a bar code or other symbol indicia provided on driver's licenses. An establishment may mount the terminal at the door or entrance and read the symbol indicia, mag stripe, RFID, etc. of the identification data carrier the customer presents. The terminal can then verify the identification data carrier includes age information, and that the customer's age is adequate for completing the transaction, such as entry into an establishment, making an age restricted purchase, etc. The terminal may reference a third party database, cull information, make comparisons and determinations, alert establishment personnel and security, etc. and send back a result. The terminal may also record the information to another database for record keeping purposes. The terminal may also record a picture of the customer and save the picture in association with the identification form presented utilizing the optical reading capability of the terminal. The terminal may also be used to advertise and market to those who attend age restricted establishments. Further description is made to copending and co-owned U.S. application Ser. No. 09/788,179 filed Feb. 16, 2001 entitled IDENTIFICATION CARD READER, which is hereby incorporated herein by reference.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

It should be understood that the illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A restaurant transaction terminal comprising:
a portable housing for hand held operation, the portable housing having a body, a touch screen, a card reader, a stylus, a speaker, a microphone, and a jack for a headset or Bluetooth headset;
an internal battery for making the restaurant transaction terminal independent of any wired connectivity;
a biometric reader for a customer and restaurant personnel for reading data from an information bearing medium carried by a customer;
a graphic user interface (GUI);
a printer integral with the housing; and,
wherein the transaction terminal is configured for use at a restaurant table by a customer based on information read from the reader within the restaurant for reading, completing, signing on the QUI a displayed bill; printing the completed and signed bill by the customer at the restaurant table and wirelessly transmitting the completed and signed bill to the restaurant such that customers may pay their bill without interaction with a store employee.

2. A transaction terminal in accordance with claim 1, wherein the restaurant transaction terminal is configured to read at least one of the following: a magnetic card; a smart card; a hybrid magnetic stripe smart card; biometric information; an optical symbology; and a RFID device.

3. A transaction terminal in accordance with claim 1, wherein the customer places an order and updates the order on the GUI or checks the meal progress by the wireless connection;
the transaction terminal accepts an order from the customer and updates the order on the GUI or facilitates the customer in monitoring the progress of the meal by the wireless connection.

4. A transaction terminal in accordance with claim 1, wherein the GUI displays daily specials for the customer and/or shows order details.

5. A transaction terminal in accordance with claim 1, wherein the transaction terminal comprises at least one of the following: a speaker, a microphone, and a Bluetooth headset utilized to communicate with the restaurant for such things as changing orders and requesting assistance.

6. A method of operating a terminal for use by a customer for paying a bill a restaurant table, the transaction terminal being hand held portable and having a housing, a graphic user interface (GUI), a printer integral with the housing, an internal battery adapted to making the restaurant transaction terminal independent of any wired connectivity, and a biometric reader, the method comprising the steps of:
obtaining personal identification information using a biometric reader at a restaurant table; and,
reading, completing, signing on the GUI a displayed bill including the option for adding a tip, the step of signing using a stylus;
pressing an accept key upon completing payment and printing the completed and signed bill by the customer at the restaurant table and wirelessly transmitting the completed and signed bill to the restaurant such that customers may pay their bill without interaction with a store employee.

7. A method of operating a transaction terminal in accordance with claim 6, wherein the terminal is configured to read at least one of the following: a magnetic card; a smart card; a hybrid magnetic stripe smart card; biometric device; an optical symbology; and a RFID device.

* * * * *